United States Patent
Thalanany et al.

(10) Patent No.: US 10,735,424 B2
(45) Date of Patent: *Aug. 4, 2020

(54) ACCESS BASED INTERNET PROTOCOL MULTIMEDIA SERVICE AUTHORIZATION

(71) Applicant: United States Cellular Corporation, Chicago, IL (US)

(72) Inventors: Sebastian Thalanany, Buffalo Grove, IL (US); Claudio Taglienti, Barrington Hills, IL (US); Michael Shannon Irizarry, Algonquin, IL (US); Narothum Saxena, Hoffman Estates, IL (US)

(73) Assignee: United States Cellular Corporation, Chicago, IL (US)

( * ) Notice: Subject to any disclaimer, the term of this patent is extended or adjusted under 35 U.S.C. 154(b) by 1350 days.

This patent is subject to a terminal disclaimer.

(21) Appl. No.: 13/908,669

(22) Filed: Jun. 3, 2013

(65) Prior Publication Data
US 2013/0269002 A1 Oct. 10, 2013

Related U.S. Application Data

(63) Continuation of application No. 11/344,333, filed on Jan. 31, 2006, now Pat. No. 8,457,109.

(51) Int. Cl.
*H04L 29/06* (2006.01)
*H04L 12/66* (2006.01)

(52) U.S. Cl.
CPC .............. *H04L 63/10* (2013.01); *H04L 12/66* (2013.01)

(58) Field of Classification Search
CPC ................................ H01L 12/66; H01L 63/10
See application file for complete search history.

(56) References Cited

U.S. PATENT DOCUMENTS

| | | | | |
|---|---|---|---|---|
| 6,650,901 B1 * | 11/2003 | Schuster | ............. | H04M 1/2473 379/142.1 |
| 7,042,985 B1 * | 5/2006 | Wright | .................. | H04M 7/006 370/352 |
| 7,177,399 B2 * | 2/2007 | Dawson | ............ | H04M 3/42229 370/352 |
| 7,260,378 B2 * | 8/2007 | Holland | ................ | G01S 5/0027 340/988 |
| 7,272,402 B1 * | 9/2007 | Ho | ........................ | H04M 7/006 379/207.01 |

(Continued)

*Primary Examiner* — Khaled M Kassim
(74) *Attorney, Agent, or Firm* — Leydig, Voit & Mayer, Ltd.

(57) ABSTRACT

The described embodiments of the present invention include a method for controlling authorization of a multimedia service requested by a user device. In one embodiment, the method includes examining an identity of an access network associated with the user device and an identity of the service requested to determine whether the service is supported; authorizing resources in the access network required by the service if the service is supported; rejecting the service if the service is not supported and if a policy associated with the access network requires unsupported services to be rejected; and authorizing a default level of resources in the access network if the service is not supported and if the policy associated with the access network does not require unsupported services to be rejected.

12 Claims, 6 Drawing Sheets

(56) References Cited

U.S. PATENT DOCUMENTS

| | | | | |
|---|---|---|---|---|
| 7,352,847 B2* | 4/2008 | Goldman | H04M 7/128 | 379/221.01 |
| 7,388,490 B2* | 6/2008 | Freitag | G01S 1/68 | 340/572.1 |
| 7,395,047 B2* | 7/2008 | Mohler | H04M 3/42314 | 379/37 |
| 7,564,838 B2* | 7/2009 | McGary | H04L 29/06027 | 370/352 |
| 2002/0120749 A1* | 8/2002 | Widegren | H04L 12/14 | 709/227 |
| 2002/0165966 A1* | 11/2002 | Widegren | H04L 12/14 | 709/226 |
| 2003/0120135 A1* | 6/2003 | Gopinathan | A61B 5/411 | 600/300 |
| 2003/0156577 A1* | 8/2003 | Dunlap | H04L 29/06 | 370/352 |
| 2003/0172160 A9* | 9/2003 | Widegren | H04L 12/14 | 709/226 |
| 2004/0059942 A1* | 3/2004 | Xie | H04L 63/029 | 726/12 |
| 2005/0002405 A1* | 1/2005 | Gao | G06F 13/102 | 370/401 |
| 2005/0027867 A1* | 2/2005 | Mueller | H04L 29/06027 | 709/227 |
| 2005/0078824 A1* | 4/2005 | Malinen | H04L 63/08 | 380/247 |
| 2005/0124299 A1* | 6/2005 | Scribano | H04W 28/18 | 455/68 |
| 2005/0185773 A1* | 8/2005 | Burger | H04M 7/006 | 379/88.22 |
| 2005/0220082 A1* | 10/2005 | Toyoda | H04L 12/6418 | 370/352 |
| 2006/0067324 A1* | 3/2006 | Kim | H04W 76/022 | 370/395.2 |
| 2006/0133354 A1* | 6/2006 | Lee | H04L 29/12509 | 370/352 |
| 2007/0019622 A1* | 1/2007 | Alt | H04L 29/06027 | 370/352 |
| 2007/0097862 A1* | 5/2007 | Moon | H04L 12/5695 | 370/230 |
| 2008/0304487 A1* | 12/2008 | Kotecha | H04L 12/66 | 370/392 |
| 2009/0011753 A1* | 1/2009 | Barnier | H04B 5/0062 | 455/422.1 |

\* cited by examiner

ACCESS BASED INTERNET PROTOCOL MULTIMEDIA SERVICE AUTHORIZATION

This patent application is a continuation of U.S. application Ser. No. 11/344,333, filed Jan. 31, 2006, (Now U.S. Pat. No. 8,457,109) entitled "Access Based Internet Protocol Multimedia Service Authorization", the contents of which are expressly incorporated herein by reference in their entirety, including any references therein.

FIELD OF THE INVENTION

The present invention relates to access network control in mobile networks. More specifically, the present invention relates to control of the authorization of multimedia services utilizing the connectivity resources provided by the access network.

BACKGROUND OF THE INVENTION

Mobile devices capable of using many wireless access protocols are currently entering the marketplace. For example, phones will soon be available that can access multimedia services by either a third generation cellular network or a Wi-Fi network based on the IEEE 802.11 series of standards. FIG. 1 shows this graphically. Mobile device 10 uses a radio access network 12 (e.g., a cellular access network based on cdma2000) to access a multimedia application or service 14 in a multimedia enabled core network 16. Alternatively, mobile device 20 can use another wireless access network 22, such as a Wi-Fi network, to access the multimedia application or service 14 via the Internet 24. Typically, these mobile devices 10, 20 are programmed to select the access network used based on availability and a preference setting. For example, a multi-protocol phone or other mobile device may be programmed to select a Wi-Fi network when it is available and the cellular network when no Wi-Fi connection is available.

IP multimedia services include a variety of multimedia applications and/or services such as Voice over IP (VoIP), streaming video, etc. that operate over Internet Protocol (IP) or IP based protocols. With the growing popularity of VoIP clients that execute over a variety of operating systems, authorization schemes for VoIP and other IP multimedia services are required to minimize the potential revenue losses to the access provider resulting from the delivery of IP multimedia services to unauthorized mobile devices.

In wireless mobile access networks and core networks, the Session Initialization Protocol (SIP) is generally used for call control associated with IP multimedia services. In an IP multimedia enabled core network (such as core network 16), the Quality of Service (QoS) constraints identified by the IP multimedia services are authorized based on the policies that are applicable to a specific access network (e.g., radio access network 12, wireless access network 22). The IP multimedia enabled core network provides the call control and services that are delivered to the mobile device (e.g., 10, 20) over one or more different types of access technologies, such as cdma2000, WLAN, etc.

In the existing mobile packet data systems, schemes for limiting the use of access network resources for unauthorized IP multimedia services (e.g., unauthorized VoIP) are required to minimize the potential for revenue loss. While SIP Proxies can be used to minimize potential revenue losses (e.g., from unauthorized VoIP service) over specific access networks, the SIP Proxies should not globally restrict access to free services that may be available over the public Internet.

SUMMARY OF THE INVENTION

One embodiment of the present invention is a method for controlling authorization of an IP multimedia service requested by a user device including: examining an identity of an access network associated with the user device and an identity of the service requested to determine whether the service is supported; authorizing resources in the access network required by the service if the service is supported; and rejecting the service if the service is not supported.

In another embodiment, a method for controlling authorization of an IP multimedia service requested by a user device includes: examining an identity of an access network associated with the user device and an identity of the service requested to determine whether the service is supported; authorizing resources in the access network required by the service if the service is supported; and authorizing a default level of resources in the access network if the service is not supported.

In another embodiment, a method for controlling authorization of an IP multimedia service requested by a user device includes: examining an identity of an access network associated with the user device and an identity of the service requested to determine whether the service is supported; authorizing resources in the access network required by the service if the service is supported; rejecting the service if the service is not supported and if a policy associated with the access network requires unsupported services to be rejected; and authorizing a default level of resources in the access network if the service is not supported and if the policy associated with the access network does not require unsupported services to be rejected.

In another embodiment, a method for controlling authorization of an IP multimedia service requested by a user device includes: establishing a mobile IP connection with an access network; acquiring an identity of the access network; transmitting the identity of the access network to a SIP Proxy server of a core network; launching a multimedia service; providing an identify of the multimedia service to the SIP Proxy server; wherein the SIP Proxy server examines an identity of an access network associated with the user device and an identity of the service requested to determine whether the service is supported, authorizes resources in the access network required by the service if the service is supported, rejects the service if the service is not supported and if a policy associated with the access network requires unsupported services to be rejected; and authorizes a default level of resources in the access network if the service is not supported and if the policy associated with the access network does not require unsupported services to be rejected.

In another embodiment, a system for providing access by a user to an IP multimedia service includes: a user device configured to establish a mobile IP connection with an access network, acquire an identity of the access network, transmit the identity of the access network to a session initialization proxy server, launch an IP multimedia service, and provide an identity of the service to the session initialization proxy server; a home subscriber server having a database including access network identities and associated supported multimedia service identities; the session initialization proxy server configured to query the home subscriber server for authorization of the multimedia service, authorize resources in the access network required by the service if the service is supported, reject the service if the service is not supported and if a policy associated with the access network requires unsupported services to be rejected; and authorize a default level of resources in the access network if the service is not supported and if the policy associated with the access network does not require unsupported services to be rejected; a policy function server configured to receive quality of service constraints from the session initialization proxy server and to supply corresponding quality of service parameters to an access gateway; and the access gateway configured to allocate bearer level resources to support the multimedia service.

BRIEF DESCRIPTION OF THE DRAWINGS

A more complete understanding of the present invention and its advantages will be readily apparent from the following Detailed Description taken in conjunction with the accompanying drawings. Throughout the accompanying drawings, like parts are designated by like reference numbers and in which.

DETAILED DESCRIPTION OF THE INVENTION

Figure 1:
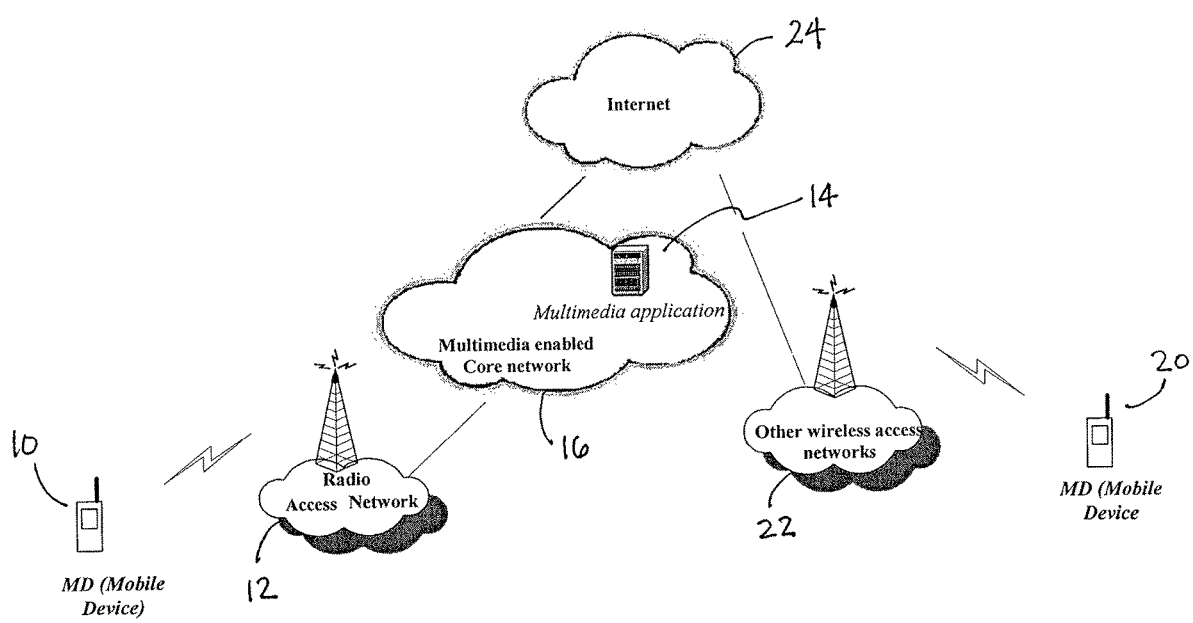
FIG. 1 is a schematic diagram showing two access networks capable of accessing an IP multimedia application or service.
Figure 2:
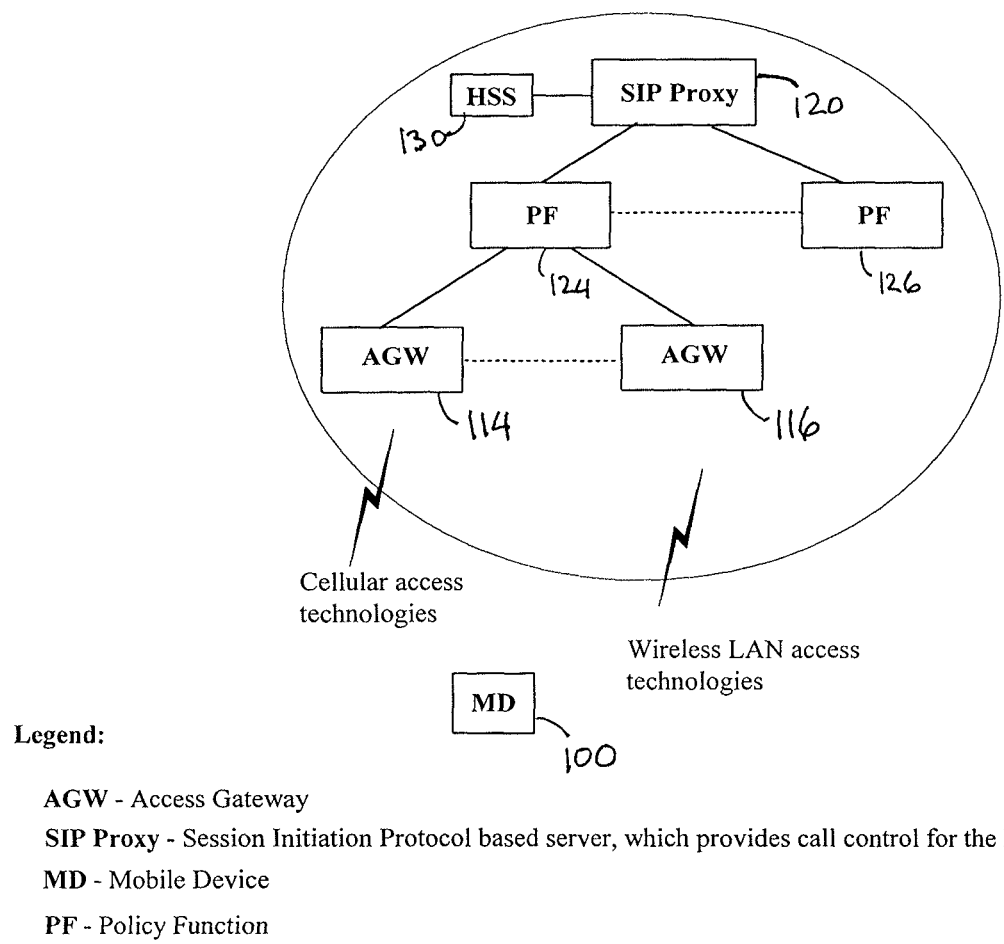
FIG. 2 is a schematic diagram showing the core and access network entities in one embodiment of the present invention.

FIG. 2 shows a diagram of the core and access network entities employed in the authorization of IP multimedia services. A mobile device (MD) 100 can connect to access gateways (AGW) 114, 116 using, for example, cellular access technologies, such as that provided by radio access network 12, or wireless LAN technologies, such as that provided by wireless access network 22.

The access gateway performs the mobility agent function to support the network layer mobility of the mobile device. The Session Initiation Protocol based call control function (SIP Proxy) 120 (see J. Rosenberg, H. Schulzrinne, G. Camarillo, A. Johnston, J. Peterson, R. Sparks, M. Handley, E. Schooler, "SIP: Session Initiation Protocol," RFC3261, IETF, June 2002; and see Camarillo, G., Marshall, W., and J. Rosenberg, "Integration of Resource Management and Session Initiation Protocol (SIP)", RFC 3312, October 2002, which are both incorporated herein by reference), Policy Function (PF) 124, 126 and the Home Subscriber Server (HSS) 130 collaborate in the authorization of the Quality of Service (QoS) constraints requested by an IP multimedia service. The QoS constraints that are authorized and enforced dictate the service experience for a mobile subscriber accessing the IP multimedia service using the mobile device 100.

One embodiment of the invention employs the access network identity as a filter for the authorization of the bearer level resources in the access network. The bearer level resources, to support the QoS constraints requested by an IP multimedia service, are enforced by the Access Gateway associated with the access network. The identity of the requested IP multimedia service is also utilized in the IP multimedia enabled core network to authorize an IP multimedia service.

In one embodiment of the invention, the core network contains IP Multimedia Subsystem (IMS) framework entities such as the SIP Proxy, Policy Function, and the Home Subscriber Server. A SIP Proxy can serve one or more PFs. A PF in turn can serve one or more AGWs associated with an access technology such as cdma2000, WLAN, etc.

Figure 3:
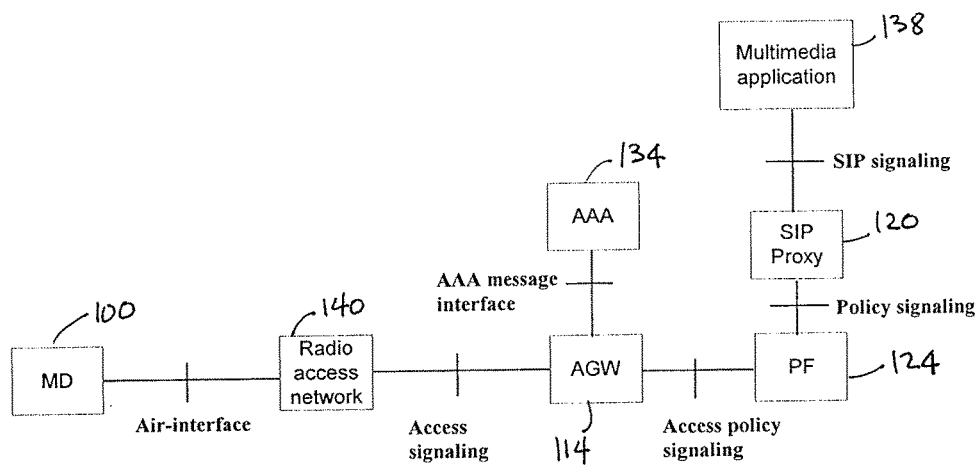
FIG. 3 is a diagram illustrating the connections between the components of FIG. 2.

FIG. 3 shows a schematic diagram of a mobile device 100 accessing an IP multimedia application or service 138 on a media server. This embodiment of the invention is particularly applicable to multimedia applications such as streaming media and VoIP, but is capable of addressing any type of data communication where QoS should be maintained.

The mobile device 100 establishes a mobile IP session with the radio access network 140, via the AGW 114. The mobile device 100 is authenticated using the authentication, authorization, and accounting (AAA) server 134. During the establishment of the mobile IP session, the mobile device 100 obtains the identity of the access network 140 via, for example, the Normal Vendor Specific Extension (NVSE) within the Mobile Internet Protocol v4 (mobile IP) (see $3^{rd}$ Generation Partnership Project 2 (3GPP2), "All-IP Network Architecture Model for cdma2000 Spread Spectrum Systems," S.R0037-0 v3.0, September 2003, which is incorporated herein by reference). After the IP connectivity with the access network 140 is established, the mobile device 100 registers with the SIP Proxy 120 using, for example, a SIP REGISTER message. The SIP REGISTER message may use, for example, a P-Access-Network-Info header to transfer the identity of the access network 140 to the SIP Proxy 120.

In one embodiment of the invention, the SIP REGISTER message includes the following fields:

Request-URI: This field contains the destination of the registration request, which is routed through the SIP Proxy 120.

To: This field contains the SIP Uniform Resource Identifier (URI) of the mobile device 100, which requires creation or modification.

From: This field contains the SIP URI of the user, who is associated with the registration. The value of this field is identical to that for the "To" header.

Call-ID: This field contains a globally unique identifier for the IP multimedia service client in the mobile device 100.

Cseq: This field contains the sequence number associated with a SIP REGISTER message.

P-Access-Network-Info: This field contains the access network identity.

Once the mobile device 100 has registered with the SIP Proxy 120, the mobile device 100 may launch an IP multimedia service. The mobile device 100 transmits a message to the SIP Proxy 120 to establish a SIP session. In one embodiment, the message is a SIP INVITE message that uses a private header extension: P-Service-Info header, which can be used to transfer the identity of the IP multimedia service to the SIP Proxy 120.

In this embodiment, the SIP REGISTER message includes the following fields:

Request-URI: This field contains the destination of the registration request, which is routed through the SIP Proxy 120.

To: This field contains the SIP URI of the mobile device 100, which requires creation, or modification.

From: This field contains the SIP URI of the user, who is associated with the registration. The value of this field is identical to that for the "To" header.

Call-ID: This field contains a globally unique identifier for the IP multimedia service client, in the mobile device 100.

Cseq: This field contains the sequence number associated with a SIP INVITE message.

P-Service-Info: This field contains the service identity of the IP multimedia service.

Content-Type: This field indicates the content type: application or Session Description Protocol (SDP).

Content-Length: This field contains the number of bytes in the SDP body. The SDP body specifies the application related QoS constraints, such as bandwidth requirements, and the media characteristics.

The SIP Proxy 120 obtains the QoS constraints from the mobile device 100 via the Session Description Protocol during the establishment of a SIP session. The QoS constraints are specified in terms of the media type, bandwidth etc. for the session associated with the IP multimedia service. The SIP Proxy 120 updates the Policy Function (PF) 124 with the QoS constraints as necessary. The PF 124 authorizes the AGW 114 to allocate the required bearer level resources based on the QoS constraints, Which were negotiated during the establishment of the session between the mobile device 100 and the SIP Proxy 120. Bearer level resources are the links that carry the media content.

Mid-session QoS constraint negotiations may also occur between the mobile device 100 and the SIP Proxy 120 based on the demands asserted by the IP multimedia service. If the mid-session QoS constraint negotiations result in a change to the QoS, the PF 124 updates the AGW 114, which in turn reallocates the required bearer level resources in the access network 140 to satisfy the QoS constraints demanded by the IP multimedia service. The allocated bearer level resources provide the necessary bandwidth and other resources to support the IP multimedia service launched by the mobile device 100.

The SIP Proxy 120 examines the access network identity (or other information relating to the access network type) contained in the P-Access-Network-Info header and the service identity (or other information relating to the service type) contained in the P-Service-Info header and compares this information with other information from a database associated with the HSS 130 to determine whether the access network 140 supports the requested service. In one embodiment, the HSS 130 database includes a look-up table containing access network identities and the service identities that are supported by each access network. The access provider policies associated with the access network 140 are defined in the PP 124. The SIP Proxy 120 transfers to the PF 124 the results of whether or not the requested service is supported over the access network 140.

If the service is supported, then the PF 124 translates the QoS constraints associated with the IP multimedia service into the bearer level QoS parameters. The QoS parameters are transferred from the PF 124 to the AGW 114, where the corresponding bearer level resources are allocated to the service.

If the service is not identifiable or is not supported or if the P-Service-Info header is absent from the SIP INVITE, then either the service is denied or the service is subjected to a default best effort QoS treatment based on the authorization policy defined by the access provider. The best effort QoS treatment would reduce the user experience for unauthorized IP multimedia services (such as VoIP traffic) over an access network segment which, in turn, would reduce or avoid related revenue losses.

Policy definitions for different access networks and technologies can be used to determine whether or not the bearer level resources are allocated by the AGW 114 and, if the resources are allocated, the corresponding QoS treatment.

Figure 4:
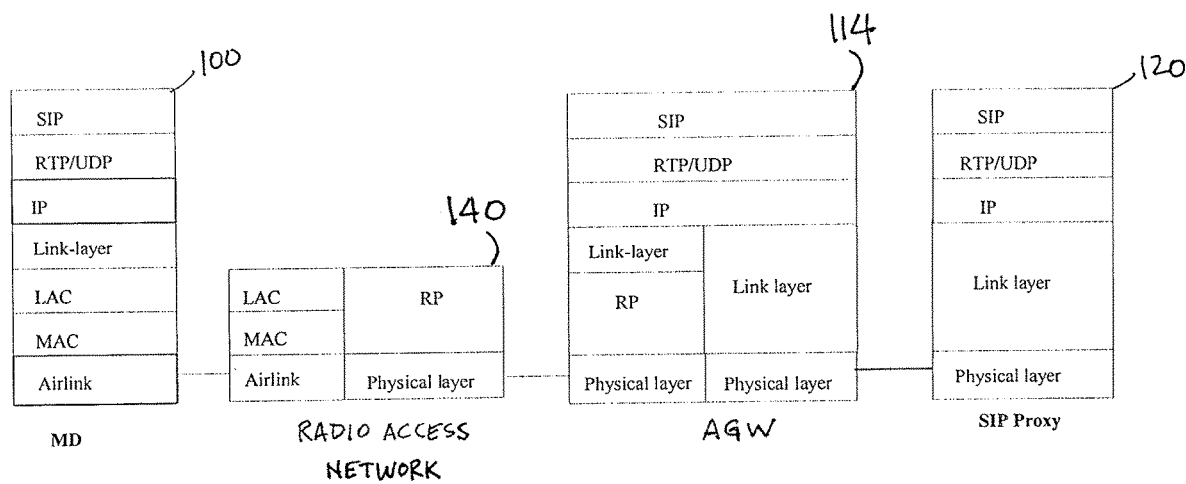
FIG. 4 is a diagram of the protocol stacks of the components of FIG. 2 showing the communications protocols used in the connections illustrated in FIG. 3.

A protocol reference model for an access based IP multimedia service authorization includes diverse radio access networks that are supported by a multimedia enabled core network is shown in FIG. 4. The physical layer and the link layer protocols would be different for different wireless access technologies. For inter-operability, the protocols at the network layer and above are based on open standards. In this model, the multimedia call control is performed via SIP, and the media streams are conveyed over real-time protocol (RTP), user datagram protocol (UDP) and Internet protocol (IP).

The SIP Proxy 120 entity supplies the QoS constraints to the PF 124, which provides the corresponding QoS parameters to the AGW 114, where it is enforced in terms of the corresponding bearer level resources. The resource allocation at the AGW 114 is enforced in terms of the access segment associated with the access technology supported by the AGW 114.

Figure 5A:
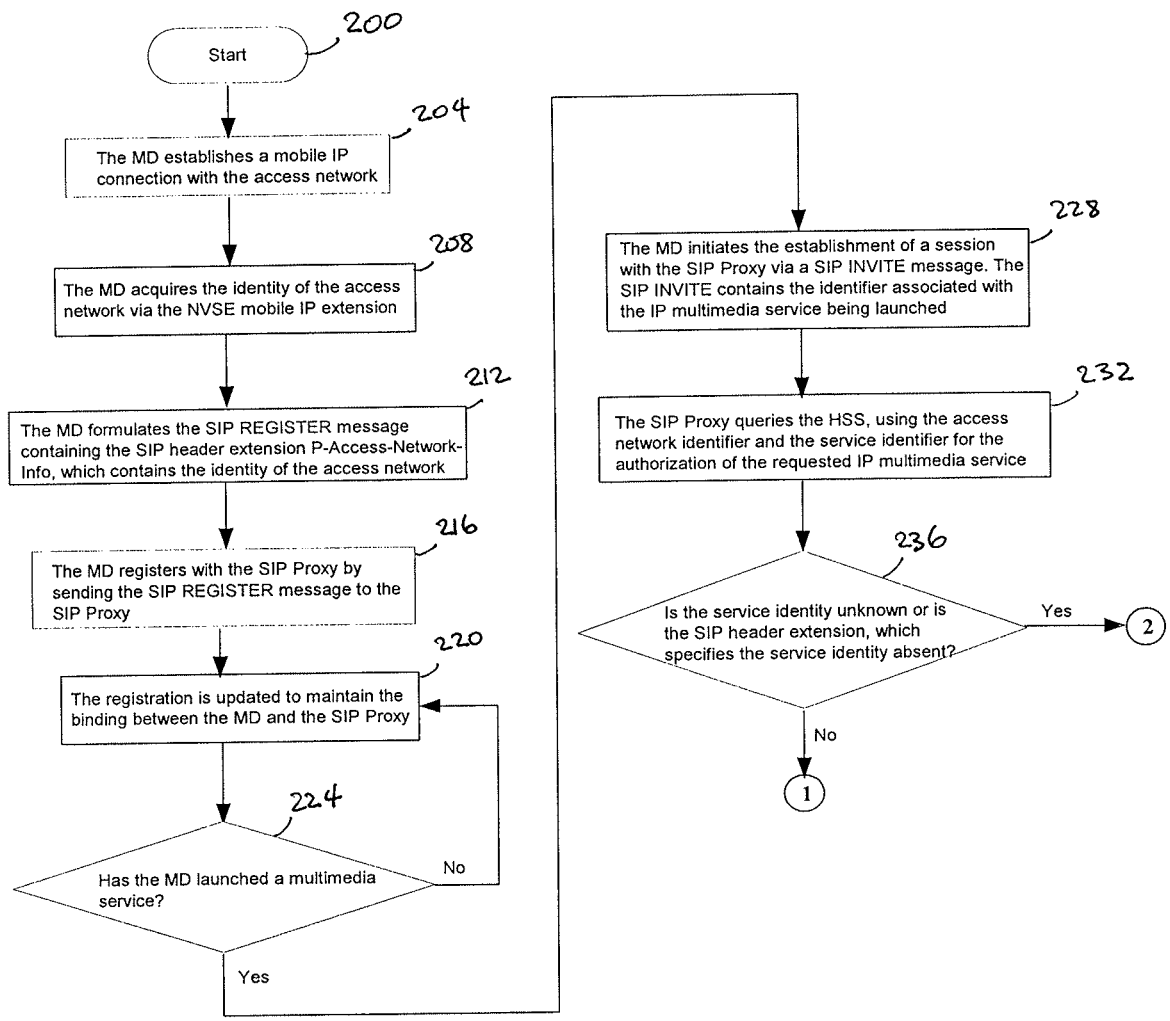
FIGS. 5A-5C are flow diagrams of a process that is one embodiment of the present invention.
Figure 5B:
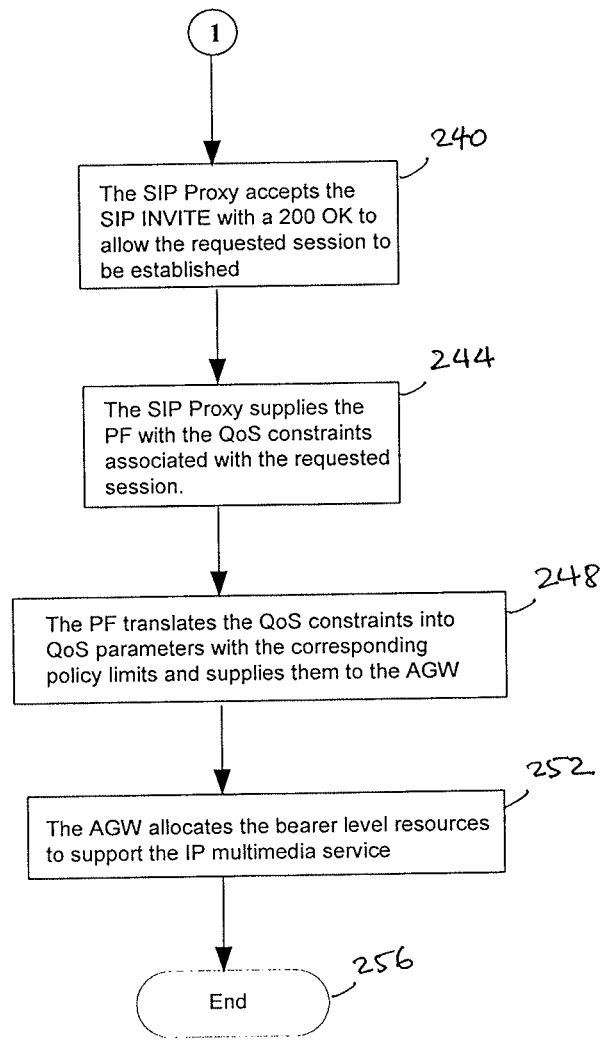
Figure 5C:
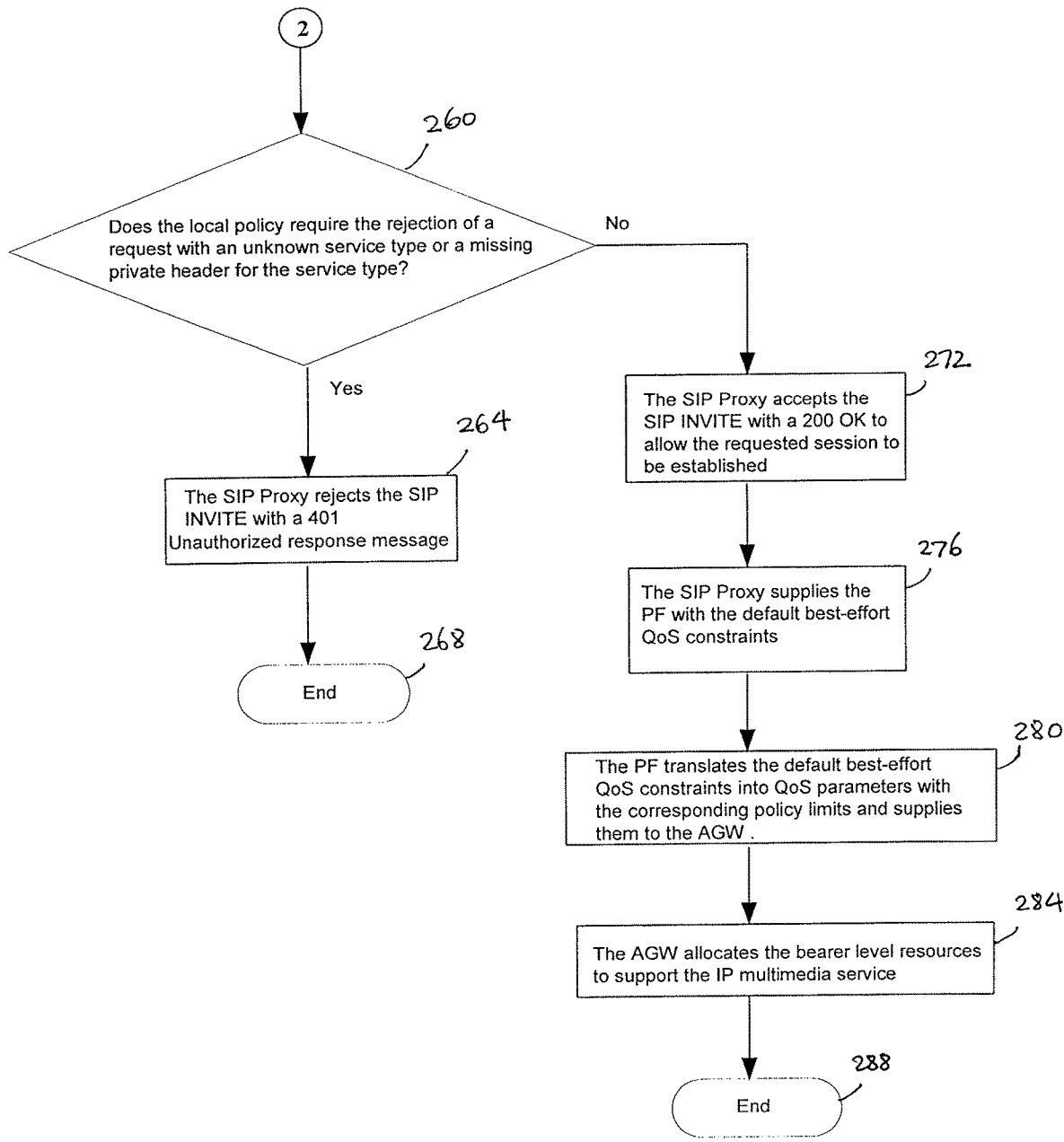

FIGS. 5A-5C show the steps used in controlling authorization of IP multimedia services. The process starts at step 200. At step 204, the mobile device establishes a mobile IP connection with the access network. At step 208, the mobile device acquires the identity of the access network via, for example, the NVSE mobile IP extension. At step 212, the mobile device formulates the SIP REGISTER message containing an identifier associated with the access network. In one embodiment, the access network identity is contained in the SIP header extension P-Access-Network-Info. The mobile device then registers with the SIP Proxy by sending the SIP REGISTER message to the SIP Proxy at step 216. At step 220, the registration is updated to maintain the binding between the mobile device and the SIP Proxy.

At step 224, it is determined whether the mobile device has launched a multimedia service. If not (No at step 224), the process returns to step 220. If the mobile device has launched a multimedia service (Yes at step 224), the process continues to step 228 wherein the mobile device initiates the establishment of a session with the SIP Proxy via, for example, a SIP INVITE message. The SIP INVITE message contains an identifier associated with the IP multimedia service being launched on the mobile device. In one embodiment, the SIP INVITE message includes a P-Service-Info header which contains the service identity of the IP multimedia service.

At step 232, the SIP Proxy provides the HSS with the access network identifier and the service identifier and queries the HSS for authorization of the requested IP multimedia service. The HSS determines whether the requested IP multimedia service is authorized at step 236. The HSS can determine whether the requested IP multimedia service is authorized by, for example, verifying the service identity against a list of authorized service identities. In one embodiment, the service identify is verified against of a list of authorized service identities associated with the particular access network to which the mobile device is currently connected. If the service identity is recognized by the HSS (No in step 236), the process continues to step 240.

At step 240, the SIP Proxy accepts the SIP INVITE and allows the requested session to be established. In one embodiment, the SIP Proxy sends a 200 OK message to the mobile device. At step 244, the SIP Proxy supplies the PF with the QoS constraints associated with the requested session. The PF translates the QoS constraints into QoS parameters with corresponding policy limits and supplies the QoS parameters and policy limit information to the AGW at step 248. At step 252, the AGW allocates the bearer level resources to support the requested service. The process then ends at step 256.

In an embodiment in which the SIP INVITE message includes a header (such as a P-Service-Info header) containing the service identity, the HSS can determine whether the requested IP multimedia service is authorized by verifying the service identity found in the header. If the header is absent or if the service identity is not recognized (Yes in step 236), the requested session is not authorized and the process proceeds to step 260.

At step 260, the process determines whether the local policy (e.g., of the access network) requires that a request with an unknown service type, or a request that is missing a header containing the service type, should be rejected. If the local policy requires that such a request be rejected (Yes in step 260), the process continues to step 264 in which the SIP Proxy rejects the SIP INVITE. In one embodiment, the SIP Proxy returns a 401 Unauthorized Response message to the mobile device. The process then ends at step 268.

Alternatively, if the local policy does not require rejection of unidentified services (No in step 260), the SIP Proxy accepts the SIP INVITE at step 272 and allows the requested session to be established. In one embodiment, the SIP Proxy sends a 200 OK message to the mobile device. At step 276, the SIP Proxy supplies the PF with the default best-effort QoS constraints. The PF translates the default best-effort QoS constraints into QoS parameters with corresponding policy limits and supplies the QoS parameters and policy limit information to the AGW at step 280. At step 284, the AGW allocates the bearer level resources to support the IP multimedia service. The process then ends at step 288.

The described embodiments provide for authorization of multimedia services to reduce the potential revenue loss incurred as a result of the delivery of unauthorized multimedia services over the access network. Although specific embodiments are described herein, they are not to be interpreted as limiting the scope of the invention. The scope of the invention is only limited by the claims appended hereto.

We claim:

1. A method for controlling authorization of a requested multimedia service requested by a user device comprising:
   examining, via a Session Initialization Protocol (SIP) Proxy server of a core network, an identity of an access network associated with the user device and an identity of the requested multimedia service;
   determining, via the SIP Proxy server, whether the requested multimedia service is supported by the access network by:
   (a) filtering bearer level resource authorization based on the identity of the access network; and
   (b) filtering the multimedia service authorization based on the identity of the requested multimedia service;
   authorizing, via the SIP Proxy server, resources in the access network required by the multimedia service requested by the user device if the multimedia service is supported as determined during the determining; and otherwise
   rejecting, via the SIP Proxy server, the multimedia service requested by the user device if the multimedia service is not supported as determined during the determining.

2. A method in accordance with claim 1, wherein the user device connects to the access network using mobile IP, the step of examining the identity of an access network associated with the user device comprising extracting the identity from a header associated with a Normal Vendor Specific Extension within the Mobile Internet Protocol.

3. A method in accordance with claim 1, wherein the user device uses a SIP INVITE message to request the multimedia service, the step of examining the identity of the service requested comprising extracting the identity from a header in the SIP INVITE message.

4. A method in accordance with claim 1, wherein the step of authorizing comprises:
   obtaining quality of service constraints from the user device; and
   providing the quality of service constraints to a Policy Function server for use in allocating bearer level resources.

5. A method for controlling authorization of a requested multimedia service requested by a user device comprising:
   examining an identity of an access network associated with the user device and an identity of the requested multimedia service;
   determining whether the requested multimedia service is supported by the access network by:
   (a) filtering bearer level resource authorization based on the identity of the access network; and
   (b) filtering the multimedia service authorization based on the identity of the requested multimedia service;
   authorizing, in response to the determining, resources in the access network required by the multimedia service requested by the user device if the multimedia service requested by the user device is supported as determined during the determining; and
   authorizing a predetermined default level of resources corresponding to policy limits in the access network if the multimedia service requested by the user device is not supported as determined during the determining.

6. A method in accordance with claim 5, wherein the user device connects to the access network using mobile IP, the step of examining the identity of an access network associated with the user device comprising extracting the identity from a header associated with a Normal Vendor Specific Extension within the Mobile Internet Protocol.

7. A method in accordance with claim 5, wherein the user device uses a Session Initialization Protocol (SIP) INVITE message to request the multimedia service, the step of examining the identity of the service requested comprising extracting the identity from a header in the SIP INVITE message.

8. A method in accordance with claim 5, wherein the step of authorizing comprises:
   obtaining quality of service constraints from the user device; and
   providing the quality of service constraints to a Policy Function server for use in allocating bearer level resources.

9. A method for controlling authorization of a requested multimedia service requested by a user device comprising:
   examining an identity of an access network associated with the user device and an identity of the requested multimedia service;
   determining whether the requested multimedia service is supported by the access network by:
   (a) filtering bearer level resource authorization based on the identity of the access network; and (b) filtering the multimedia service authorization based on the identity of the requested multimedia service;

authorizing, in response to the determining, resources in the access network required by the multimedia service requested by the user device if the multimedia service requested by the user device is supported as determined during the determining;

rejecting the multimedia service requested by the user device if the multimedia service requested by the user device is not supported and if a policy associated with the identified access network requires requests for unsupported multimedia services to be rejected; and authorizing a predetermined default level of resources corresponding to policy limits in the access network if the requested multimedia service is not supported and if the policy associated with the identified access network does not require requests for unsupported multimedia services to be rejected.

10. A method in accordance with claim 9, wherein the user device connects to the access network using mobile IP, the step of examining the identity of an access network associated with the user device comprising extracting the identity from a header associated with a Normal Vendor Specific Extension within the Mobile Internet Protocol.

11. A method in accordance with claim 9, wherein the user device uses a Session Initialization Protocol (SIP) INVITE message to request the multimedia service, the step of examining the identity of the service requested comprising extracting the identity from a header in the SIP INVITE message.

12. A method in accordance with claim 9, wherein the step of authorizing comprises:

obtaining quality of service constraints from the user device; and providing the quality of service constraints to a Policy Function server for use in allocating bearer level resources.

\* \* \* \* \*